United States Patent [19]

Yoshioka et al.

[11] 3,917,819

[45] Nov. 4, 1975

[54] METHOD FOR PREVENTING RESPIRATORY MYCOPLASMOSIS OF LIVESTOCKS

[75] Inventors: Morimasa Yoshioka; Eizo Hayatsu, both of Tokyo, Japan

[73] Assignee: The Kitasato Institute, Tokyo, Japan

[22] Filed: Sept. 17, 1973

[21] Appl. No.: 397,909

[30] Foreign Application Priority Data
Oct. 5, 1972    Japan.............................. 47-100028

[52] U.S. Cl. ................................................ 424/88
[51] Int. Cl.² .......................................... C12K 5/00
[58] Field of Search ................................ 424/88–92

[56] References Cited
OTHER PUBLICATIONS

Adler et al., V.B. No. 3893 (1971), Abstract of "Immunization Against Mycoplasma Gallisepticum," Avian, Dis. 14: 763–769 (1970).

Papageorgiou, V.B. No. 5668 (1971), Abstract of "Immunization Against Avian Mycoplasmosis, I. Attentuation of a Strain of Mycoplasma Gallisepticum, II. Use of the Live Attenuated Vaccine," Bull. Acad. VBT, Fr. 43: 363–375 (1970).

*Primary Examiner*—Shep K. Rose
*Attorney, Agent, or Firm*—Armstrong, Nikaido & Wegner

[57] ABSTRACT

Respiratory mycoplasmosis of livestocks such as fowl chronic respiratory disease, swine enzootic pneumonia and contagious pleuropneumonia of goats are effectively immunised by spraying or injecting into tracheas of the livestocks killed Mycoplasma vaccine which is a suspension of killed Mycoplasma cells, with suspension stabilizer such as gelatin, serum of the livestocks, saccharides, amino acids and Tween 80.

18 Claims, No Drawings

METHOD FOR PREVENTING RESPIRATORY MYCOPLASMOSIS OF LIVESTOCKS

This invention relates to killed vaccines for immunizing livestocks from respiratory infectious disases caused by Mycoplasma, and to a process for preparing the same.

Heretofore, respiratory mycoplasmosis of livestocks have been prevailed in all countries of the world. There are such diseases as chronic respiratory diseases of poultries caused by *Mycoplasma gallisepticum*, sacculitis of poultries caused by *Mycoplasma synoviae*, enzootic pneumonia of swine caused by *Mycoplasma suipneumoniae*, contagious pleuropneumonia of goats caused by *Mycoplasma mycoides* var. capri, etc. These enzootic respiratory Mycoplasma diseases of livestocks are highly contagious, and it is well known that as the result of infection with one or more of said Mycoplasma diseases, the ratios of body weight increase, egg-production and fertilization are lowered, and the numbers of waste chickens are increased in poultry feed efficiency and body weight increase ratio are decreased in hogs; grow weak and die of diarrhea caused by the said disease in goats. Therefore, the poultry industry anad stock-raisers are suffering from a great economical damage through the said mycoplasmosis. Accordingly, the establishment of countermeasures has been desired for preventing the said enzootic respiratory diseases caused by Mycoplasma.

With the aim to cure the enzootic respiratory Mycoplasma diseases of livestocks, several antibiotics are tried and used, but it is extremely difficult to eradicate the aforesaid diseases by the use of antibiotics. For immunization for the said diseases, living vaccines using attenuated strains have been proposed [U.S. Pat. No. 3,534,136 (1970)]. As the back fo the virulence and the vertical transmission of the vaccine organisms are the problems to be throughly clarified in living vaccines, the development of effective and safe inactivated vaccines is desired. As to inactivated vaccines, there have been reports concerning various adjuvant vaccines which is administered by intramuscular injection [McMartin, D. A., and Shifrine, M. :Am. J. of Veter. Res., Vol. 21, page 482 (1960); Adler, H. E., Fabricant, J., Yamamoto, R., and Berg. J. : Am. J. of Veter. Res., Vol. 19, page 440 (1958)]. However, all these adjuvant vaccines cannot sufficiently prevent the said diseases, and hence have not been put into wide use.

An object of the present invention is to provide an immunization procedure for Mycoplasma diseases in livestocks.

Another object of the present invention is to provide a killed vaccine acceptable for the immunization procedure for mycroplasmosis in livestocks.

The present inventors have found the fact that the above-mentioned diseases can be prevented by immunizing the livestocks through the tracheas by the use of a killed vaccine suspension comprising killed cells of Mycoplasma in an aqueouos medium.

Thus, according to the present invention, there are provided a method for preventing enzootic respiratory mycoplasmosis of livestocks characterized by the use of spraying or injecting a killed Mycoplasma vaccine into traches of the livestocks and a killed Mycoplasma vaccine suspension therefor.

The killed Mycoplasma vaccine used in the present invention is prepared by cultivating Mycoplasma organisms collecting the organisms, killing the organisms and suspending the killed organisms in an aeuqous medium, and then adding a suspension stabilizer into the killed Mycoplasma cell suspension.

For cultivation, there is used, a Mycoplasma cell propagation liquid culture medium which contains a basic cultivation liquid medium having, the following composition:

| Beef heart infusion | 7.0 g |
| Peptone | 10.0 g |
| Sodium chloride | 5.0 g |
| Water to make | 1,000 ml |

The liquid medium is additionally incorporated with a suitable carbon source such as glucose in an amount of 0.1 to 1.0% wt/vol. In case of the cultivation of *Mycoplasma gallisepticum* poultry serum is further added in an amount of 5 to 15% by volume. In case of the cultivation of *Mycoplasma synoviae*, the medium is further added with 5 to 15% of poultry serum, 0.001 to 0.1% wt/vol. of diphosphopyridine nucleotide, 0.001 to 0.1% of L-cysteine hydrochloride and 0.01 to 0.1% wt/vol. of Eagle vitamins (100 × concentrate)*.

[*A trade mark for multi-vitamine concentrate preparation used for culture medium. Manufactured by and sold from Difco Laboratories Inc., Detroit, Michigan, U.S.A.

One liter of the concentrate contains:

| d-Biotin | 0.24 mg |
| Folic acid | 0.44 mg |
| Niacinamide | 0.12 mg |
| Calcium pantothenate | 0.24 mg |
| Pyridoxal hydrochloride (U.S.P.) | 0.20 mg |
| Thiamine hydrochloride | 0.34 mg |
| Riboflavine | 0.04 mg |
| Choline chloride | 0.14 mg |

For the cultivation of *Mycoplasma suipneumoniae*, the medium is further added with 10 to 20% wt/vol. of swine serum; and for the cultivation of *Mycoplasma mycoides* var. capri, the medium is further added with 5 to 15% wt/vol. of goat serum.

Alternatively, each of the above-mentioned serums may be replaced by an egg yolk component in the range of 3 to 8% wt/vol. The egg yolk component can be prepared by extracting an egg yolk with an equal amount of pure water (e.g. deionized or distilled water) or an aqueous medium having a pH of 6.0 to 7.8, such as for example, an physiological saline solution, M/100 of a phosphate buffer solution or a mixture of M/100 of phosphate buffered physiological saline solution. The extraction can be carried out, for example, by stirring a mixture of egg yolk and deionized water (1 : 1 by volume) at 56°C for 2 hours, and then cooled to a room temperature. The mixture is then centrifuged at 10,000 rpm. and the resulting supernatant fluid is filtered under a sterile condition to obtain an egg yolk component.

Each of the aforesaid Mycoplasma strains is inoculated into the thus prepared Mycoplasma cell propagation liquid culture medium and cultured aerobically at 35°–38°C for 1 to 7 days to obtain Mycoplasma cells in a high yield e.g. 1.0 g to 5.0 g of the wet cells per 1 liter of the cultured liquid medium.

In order to harvest the Mycoplasma cells, the cultured liquid medium is centrifuged by the use of a centrifugal separator at 8000 rpm. or more for 20 minutes or more or by the use of a continuous centrifugal separator, for example, at 16000 rpm (about 25000 G).

Alternatively, the cultured liquid medium is added with an aluminum hydroxide gel or an aluminum phosphate gel as an adsorbent to separate or precipitate the Mycoplasma cells. The amount of the adsorbent used is in ranging from 10 to 400 ml, preferably from 30 to 100 ml, per 1 liter of the cultured liquid medium.

The cells thus harvested are then added with a physiologically acceptable aqueous medium having a pH of 6.0 to 7.8, preferably a pH of 6.5 to 7.4, such as physiological saline solution, M/100 of a phosphate buffer solution or a mixture of M/100 phosphate buffered physiological saline solution to obtain a cell suspension of the Mycoplasma strain. A typical example of a mixture of phosphate buffered saline solution has the following composition:

| | | |
|---|---|---|
| $NaH_2PO_4.2H_2O$ | 507 | mg |
| $NaHPO_4$ | 958 | mg |
| NaCl | 8.5 | g |
| Water to make | 1,000 | cc. |
| pH | 7.2 | |

In the above manner, the obtained cell suspension is adjusted to such a concentration that the number of cells per ml becomes more than $2.0 \times 10^5$.

The resulting cell suspension is heated at 50° to 56°C for 5 to 30 minutes, or is added with a killing agent in an amount to be added as indicated for example, such as formalin (0.01 to 0.5% wt/vol), sodium ethylmercury salicylate (0.01 to 0.02% wt/vol) or $\beta$-propiolactone (0.01 to 0.2% wt/vol) to kill the cells.

Alternatively, the precipitate is suspended in a small amount of physiological saline solution, and the resulting suspension is subjected to such inactivation treatment as to completely destroy the Mycoplasma cells by means of a physical operation such as ultrasonic disintegration at 10 kilocycles per second for 0.5–1.0 minute or French pressing, and then diluted with the physiological saline solution to attain the above-mentioned cell concentration, thereby obtaining a killed cell suspension.

The thus prepared inactivated Mycoplasma vaccine is a suspension of killed Mycoplasma cells or its fractions in a physiological saline solution of pH 6.0 to 7.8, the number of cells or fractions corresponding to at least $2.0 \times 10^5$ per ml of the suspension of living cell.

An excellent immunization effect can be obtained even when the killed cell suspension is used also, but to enhence its effect, the suspension may preferably contain a suspension stabilizer.

As to the suspension stabilizer, one or mixtures of the below-mentioned physiologically acceptable substances are usable, in the amount as indicated.

Saccharides: Glucose (0.3–1.0%), sucrose (0.5–1.0%), lactose (0.1–1.0%), or dextran (0.5–3.0%).

Amino acids: Glutamic acid (0.1–0.5%), or glycine (0.5 to 5.0%).

Serums:
In the case of *Mycoplasma gellisepticum* or *Mycoplasma synoviae:*
Poultry serum (0.1–1.0%), or poultry serum albumin (0.1–0.5%).
In the case of *Mycoplasma suipneumoniae:*
Swine serum (0.1–1.0%), or swine serum albumin (0.1–0.5%).

In the case of *Mycoplasma mycoides* var. capri:
Goat serum (0.1–1.0%), or goat serum albumin (0.1–0.5%).

Others:
Tween 80* (0.05–0.5%), gelatin (0.01–0.05%), or disodium ethylenediamine-tetraacetate (0.03–0.3%). (*Tween 80: A trademark for sorbitan monooleate of polyoxyethylene condensate. Manufactured by and sold from Atlas Chemical Industries Inc., Chemicals Division, Wilmington, Del., U.S.A.

When the suspension stabilizer is added to the inactivated cell suspension, the cell suspension is homogenized by the use of any physical methods, for example, an ultrasonic treatment at 10 kilocycle per second for 30 seconds to 1 minute or shaking with glass beads, and then the suspension stabilizer as mentioned above is added in a suitable amount into the cell suspension to obtain the suspension of killed Mycoplasma vaccine.

The prevention of respiratory diseases caused by infection with Mycoplasma is effected through immunization of respiratory organs of livestocks by spraying or injecting the vaccine suspension into tracheas.

It should be noted the fact that the suspension of killed Mycoplasma vaccine of the present invention cannot provide any distinct preventive effect when the vaccine is intramusclularly injected either alone or in admixture with various adjuvants such as, for example, "Bacto-Adjuvant, Complete Freund" **, magnetic iron oxide, a mixture of sodium alginate and calcium chloride, a mixture of inactivated *Hemophilus gallinarum* and aluminum hydroxide gel or an aluminum hydroxide gel.

[** A trademark for an adjuvant of the following composition:
Arlacel A[(1)] (Mannite monooleate) 1.5 ml
Bayol F[(2)] (Paraffin oil) 8.5 ml
*Mycobacterium butyricum* (killed and dried). Manufactured by and sold from Difco Laboratories, Inc., Detroit, Michigan, 48201, U.S.A.
1. A trademark for a nonionic emulsifier for use in pharmaceuticals. It is a fatty acid partial ester of polyol anhydride. Manufactured by and sold from Atlas Chemical Industries, Inc. Wilmington, Del., 19899, U.S.A.
2. A trademark for a technical-grade white mineral oil that is used where U.S.P. or N.F. quality is not required. Manufactured by and sold from Humble oil & Refining Co., Houston, Texas, 77001, (U.S.A.)]

The suspension of inactivated Mycoplasma vaccine of the present invention, however, can give an excellent preventive effect when it is independently inoculated into the traches by spraying or tracheal injection. Thus the immunization procedure carried out by spraying or injecting the present vaccine into traches is a safe immunization procedure bringing no such side-effects as induration of injected sites which have frequently been observed in the case of intramuscular injection of the prior art inactivated vaccines.

The amount of the present suspension of killed Mycoplasma vaccine to be administered by spraying or by injecting into tracheas may vary depending upon the degree of the infection of livestocks. 0.1 milliliters or more amounts of the suspension of killed *Mycoplasma gallisepticum* or *Mycoplasma synoviae* vaccine or mixture thereof can be used for preventing air sacculitis of poultries: 0.5 ml or more amounts of the suspension of killed *Mycoplasma suipneumoniae* vaccine can be used for preventing enzootic pneumonia of pigs; 0.5 ml or more amounts of the suspension of killed *Mycoplasma mycoides* var. capri can be used for preventing contagious pleuropneumonia of goats. Usually, the vaccines may be administered by spraying or injecting into tracheas by the use of nebulizer or any suitable spraying apparatus, 2 or 3 or even more times at intevals of 10 days.

Suspension of killed Mycoplasma vaccines of the present invention show significant effects on immunizing the infection with virulent Mycoplasma strain, even if the livestocks being immunized with the vaccine are further infected with other pathogenic microorganisms.

The present invention is illustrated in detail below with reference to examples, but the scope of the invention is not limited to the examples.

EXAMPLE 1

One liter of the basic Mycoplasma cultivation liquid medium was added with 0.5% wt/vol of glucose and 10% by volume of heated chicken serum to prepare a cell propagation liquid culture medium. Subsequently, *Mycoplasma gellisepticum* was inoculated in the medium, and cultured under aerobic conditions at 35° to 38°C for 2 days. After the cultivation the cultured liquor was centrifuged at 13,000 rpm. for 30 minutes to obtain a precipitate of *Mycoplasma gallisepticum* cells. To this precipitate was added an aqueous phosphate buffered physiological saline solution having pH of 7.2 so as to prepare a cell suspension containing more than $2.0 \times 10^5$ cells per ml. The thus prepared cell suspension was added with 0.01% of formalin to kill the cells. Thereafter, the killed cell suspension was homogenized by ultrasonic treatment at 10 kilocycle per second for 30 seconds, and then added with, as a suspension stabilizer, a mixture of 0.02% of gelatin and 0.1% of Tween-80 to obtain a suspension of killed vaccine of *Mycoplasma gallisepticum*.

EXAMPLE 2

Example 1 was repeated, except that the heated chicken serum among the components of the *Mycoplasma gallisepticum* cell propagation medium was replaced by 6% by volume of egg yolk component extracted with deionized water. There was obtained a suspension of killed vaccine of *Mycoplasma gallisepticum*.

EXAMPLE 3

Example 1 was repeated, except that the centrifugal separation of *Mycoplasma gallisepticum* cells was replaced by adding 50 ml of aluminum hydroxide gel to 1000 ml of the cultured medium. There was obtained a suspension of killed vaccine of *Mycoplasma gallisepticum*.

EXAMPLE 4

Example 1 was repeated, except that *Mycoplasma gallisepticum* and 10% by volume of the heated chicken serum were respectively replaced by *Mycoplasma synoviae* and 13% by volume of heated chicken serum and further 0.01% diphosphorpyridine nucleotide, 0.01% of L-cysteine hydrochloride and 0.025% Eagle-Vitamins (100 × concentrate) were added. There was obtained a suspension of killed vaccine of *Mycoplasma synoviae*.

EXAMPLE 5

Example 1 was repeated, except that *Mycoplasma gallisepticum* and the heated chicken serum were respectively replaced by *Mycoplasma suipneumoniae* and 2.0% by volume of heated swine serum. Cultivation was carried out for 4 days. There was obtained a suspension of killed vaccine of *Mycoplasma suipneumoniae*.

EXAMPLE 6

Example 5, was repeated, except that the heated swine serum was replaced by 6% by volume of egg yolk component used in Example 2. There was obtained a suspension of killed vaccine of *Mycoplasma suipneumonia*.

EXAMPLE 7

Example 1 was repeated, except that *Mycoplasma gallisepticum* and, the heated chicken serum were respectively replaced by *Mycoplasma mycoides* var. capri, and 1.0% by volume of heated goat serum. There was obtained a suspension of killed vaccine of *Mycoplasma mycoides* var. capri.

EXAMPLE 8

Example 7 was repeated, except that the heated goat serum was replaced by 6% by volume of egg yolk component used in Example 2. There was obtained a suspension of killed vaccine of *Mycoplasma mycoides* var. capri.

The effect of the present method for immunization of mycoplasmosis is shown in the following Tests (Tests 1–4) in which results from spraying the present vaccine into tracheas and intramuscular injection of the present vaccine with an adjuvant are compared.

Test 1

Ten specific pathogen-free (SPF) chickens of 10 days old in one test group were immunized by spraying into respiratory tract with the suspension of killed vaccine of *Mycoplasma gallisepticum* obtained in Example 1.

Another 10 SPF-chickens of 10 days old in the second group were immunized by intramuscular injection with the same suspension of killed vaccine used in the first group.

Further, 10 SPF-chickens of 10 days old in other groups were immunized by intramuscular injection with each of a various adjuvants with the same suspension of killed vaccine used in the first group. The immunizations were carried out 3 times at intervals of 10 days. Immunization dose at one time was 0.1 ml. Ten days thereafter, all the test chickens in three groups were challenged by spraying with varulent *Mycoplasma gallisepticum* strain having $3.2 \times 10^5$ or $1.6 \times 10^4$ living cells. Two weeks after the challenge, the test chickens were sacrified and examined to evaluate the effects of the vaccines according chiefly to the macroscopic lesions of air sacs. The results are shown in Table 1.

Table 1

| Vaccine | Adjuvant | Route | Challenge dose (Number of living cells) | Lesion score of air sacs* |
|---|---|---|---|---|
| — | | In the | $3.2 \times 10^5$ | 2.65 |

Table 1-continued

| Vaccine | Adjuvant | Route | Challenge dose (Number of living cells) | Lesion score of air sacs* |
|---|---|---|---|---|
| | | muscles | $1.6 \times 10^4$ | 1.80 |
| | Bacto-Adjuvant, | " | $3.2 \times 10^5$ | 2.75 |
| Suspension of | Complete Freund** | | $1.6 \times 10^4$ | 2.10 |
| killed | Magnetic iron oxide | " | $3.2 \times 10^5$ | 2.80 |
| vaccine of | | | $1.6 \times 10^4$ | 2.00 |
| *Mycoplasma* | Sodium alginate + | " | $3.2 \times 10^5$ | 2.70 |
| *gallisepticum* | Calcium chloride | | $1.6 \times 10^4$ | 1.90 |
| obtained in | Inactivated Hemophilus | | $3.2 \times 10^5$ | 3.00 |
| Example 1. | *gallinarum* + Aluminum | " | $1.6 \times 10^4$ | 2.05 |
| | hydroxide gel | | | |
| | Aluminum hydroxide gel | " | $3.2 \times 10^5$ | 2.70 |
| | | | $1.6 \times 10^4$ | 1.85 |
| | — | Intra-tracheas | $3.2 \times 10^5$ | 1.75 |
| | | | $1.6 \times 10^4$ | 1.40 |
| | — | — | $3.2 \times 10^5$ | 3.15 |
| | | | $1.6 \times 10^4$ | 2.00 |
| Control | — | — | — | 0.60 (Normal) |

(*Average value of scores showing the degree of lesion of air saces regarding the respective test groups consisting of 10 chickens. The score of each chickens is obtained as an average value of the score of degree of the disease of four air sacs. The degrees of lesion is evaluated according to the state of air sacs as shown below:

0: Normal
1: Thickness of air sacs
2: Focal lesions
3: Formation of even one caseous lump.
4: Formation of many or overall caseous lumps)

As is clear from Table 1, it has been found that the above-mentioned suspension of killed vaccine cannot provide any distinct preventive effect when intramuscularly immunized either alone or in admixture with various adjuvants, but can give the preventive effect when it is directly inoculated into the trachea.

Test 2

Test 1 was repeated, except that the suspension of killed vaccine of *Mycoplasma gallisepticum* and the virulent *Mycoplasma gallisepticum* were respectively replaced by the suspension of killed vaccine of *Mycoplasma synoniae* obtained in Example 4 and virulent *Mycoplasma synoviae* having $5.7 \times 10^5$ living cells. The results obtained are shown in Table 2.

Table 2

| Vaccine | Adjuvant | Route | Challenge dose (Number of living cells) | Lesion score of air sacs* |
|---|---|---|---|---|
| | — | In the muscles | $5.7 \times 10^5$ | 2.20 |
| Suspension | Bacto-Adjuvant, | " | " | 2.25 |
| of killed | Complete Freund | | | |
| vaccine of | Magnetic iron oxide | " | " | 2.30 |
| *Mycoplasma* | Sodium alginate + | " | " | 2.25 |
| *synoviae* | Calcium chloride | | | |
| obtained in | Inactivated *Hemophilus* | " | " | 2.20 |
| Example 4 | *gallinarum* + Aluminum | | | |
| | hydroxide gel | | | |
| | Aluminum hydroxide gel | " | " | 2.20 |
| | — | Intra-trachea | " | 1.55 |
| Control | — | — | " | 2.35 |
| | — | — | — | 0.50 |

(*Same as in Table 1)

Test 3

Test 1 was repeated, except that the suspension of killed vaccine of *Mycoplasma gallisepticum*, the virulent *Mycoplasma gallisepticum* and SPF-chickens were respectively replaced by the suspension of killed vaccine of *Mycoplasma suipneumoniae* obtained in Example 5, virulent *Mycoplasma suipneumoniae* having $5.5 \times 10^9$ living cells, and SPF-pigs of 3 to 4 weeks old. The immunization dose of one time was 0.5 ml. Ten days after the final immunization, the pigs were challenged by spraying with virulent *Mycoplasma suipneumoniae* having $5.5 \times 10^9$ living cells. After 6 weeks, the test pigs were dissected to evaluated the effects of the vaccines according to pathological observation on the lungs. The results obtained are shown as in Table 3.

Table 3

| Vaccine | Adjuvant | Route | Challenge dose (Number of living cells) | Infection rate* |
|---|---|---|---|---|
| | — | Intra-musclar | $5.5 \times 10^9$ | 8/10 |
| | Bacto-Adjuvant, Complete | " | " | 7/10 |
| Suspension of killed | Freund | | | |
| vaccine of *Mycoplasma* | Magnetic iron oxide | " | " | 8/10 |
| *suipnemoniae* obtained in Example 5 | Sodium alginate + Calcium chloride | " | " | 9/10 |
| | Inactivated *Hemophilus gallinarum* + Aluminum hydroxide gel | " | " | 8/10 |
| | Aluminum hydroxide gel | " | " | 9/10 |

Table 3-continued

| Vaccine | Adjuvant | Route | Challenge dose (Number of living cells) | Infection rate* |
|---|---|---|---|---|
|  | — | Intra-trachea | " | 4/10 |
| Control | — | — | " | 9/10 |
|  | — | — | — | 0/10 |

(*The denominator shows the number of test pigs, and the numerator shows the number of lung disease-positive pigs.)

Test 4

Test 3 was repeated, except that the suspension of killed vaccine of Mycoplasma suipneumoniae, the virulent Mycoplasma suipneumoniae and the SPF-pigs were respectively replaced by the suspension of killed vaccine of Mycoplasma mycoides var. capri obtained in Example 7, virulent Mycoplasma mycoides var. capri having 7.0 × 10⁸ living cells and SPF-goats of 3 week old. The results obtained are shown in Table 4.

Table 4

| Vaccine | Adjuvant | Route | Challenge dose (Number of living cells) | Infection rate* |
|---|---|---|---|---|
|  | — | Intra-muscular | 7.0 × 10⁸ | 7/10 |
|  | Bacto-Adjuvant, Complete Freund | " | " | 7/10 |
| Suspension of killed vaccine of Mycoplasma mycoides var. capri obtained in Example 7. | Magnetic iron oxide | " | " | 8/10 |
|  | Sodium alginate + Calcium chloride | " | " | 8/10 |
|  | Inactivated Hemophilus gallinarum + Aluminum hydroxide gel | " | " | 7/10 |
|  | Aluminum hydroxide gel | " | " | 8/10 |
|  | — | Intra-trachea | " | 4/10 |
| Control | — | — | 7.0 × 10⁸ | 8/10 |
|  | — | — | — | 0/10 |

(*The denominator shows the number of test goats, and the numerator shows the number of lung disease-positive goats.)

In order to know the preventive effect of the suspension of killed vaccine of Mycoplasma on respiratory diseases of livestocks caused by contagion with virulent Mycoplasma-infected livestocks, the following tests (Tests 5-9) were conducted.

Test 5

SPF-Chickens of 10 days old were immunized 2 or 3 times with an intervals of 10 days with more than 0.1 ml. of the suspension of killed vaccine of Mycoplasma gallisepticum obtained in Example 1 by intratracheal injection or spraying. Ten days after the final immunization, a total of 40 chickens consisting of 20 chickens of immunized group and 20 chickens of non-immunized group (control group) were allowed to live together with 10 chickens which had been infected by spraying with virulent Mycoplasma gallisepticum having 2.3 × 10⁵ living cells. After 4 weeks, the preventive effects of the inactivated vaccine on chickens' respiratory Mycoplasma diseases derived from the said strain were evaluated according to the lesion grade of air sacs and to the results of isolation of Mycoplasma gallisep-ticum from the tracheas, lungs and air sacs. The results obtained were as set forth in Table 5.

Table 5

| Mode of administration of suspension of killed vaccine | Air sac infected (*-1) | Isolation of Mycoplasma gallisepticum (-2) | | | Total evaluation (*-3) | Infection rate (%) |
|---|---|---|---|---|---|---|
|  |  | Trachea | Lung | Air sac |  |  |
| Intra-tracheal injection | 0/20 | 0/20 | 0/20 | 0/20 | 0/20 | 0 |
| Spraying | 0/20 | 0/20 | 0/20 | 0/20 | 0/20 | 0 |
| Control | 5/20 | 7/20 | 5/20 | 5/20 | 7/20 | 35 |

(*-1) The denominator shows the number of test chickens, and the numerator shows the number of chickens suffering from air sac disease.
(*-2) The denominator shows the number of test chickens, and the numerator shows the number of chickens, from the tracheas, lungs and air sacs of which had been isolated Mycoplasma gallisepticum.
(*-3) The denominator shows the number of test chickens, and the numerator shows the number of chickens, which were suffering from air sac disease and from the tracheas, lungs and air sacs of which had been isolated Mycoplasma gallisepticum, i.e. the number of infected chickens.)

Test 6-1

Test 5 was repeated, except that the suspension of killed vaccine of Mycoplasma gallisepticum and the virulent Mycoplasma gallisepticum were respectively replaced by the suspension of killed vaccine of Mycoplasma synoviae obtained in Example 4 and viluent Mycoplasma synoviae having 5.0 × 10⁵ living cells. Contagion of the immunized group and the non-immunized group with the infected group was made 12 days after the final immunization. The results obtained are shown in Table 6-1.

Table 6–1

| Mode of administration of suspension of killed vaccine | Air sac infected (*-1) | Isolation of Mycoplasma synoviae (*-2) | | Total evaluation (*-3) | Contagion ratio (%) |
|---|---|---|---|---|---|
|  |  | Trachea | Air sac |  |  |
| Intra-tracheal injection | 0/20 | 0/20 | 1/20 | 1/20 | 5 |
| Spraying | 0/20 | 0/20 | 1/20 | 1/20 | 5 |
| Control | 3/20 | 5/20 | 8/20 | 8/20 | 40 |

(*-1, *-2, *-3: See the legends in Table 5)

Test 6-2

Test 6-1 was repeated, except that during 7 days after the final immunization, the immunized group was infected with Infectious bronchitis virus and Newcastle disease virus administered by drinking water containing said viruses and then 5 days thereafter, the infected groups were allowed to live together with 10 chickens which had been infected with virulent Mycoplasma synoviae as in Test 6-1. The results obtained are shown in Table 6-2.

Table 6–2

| Mode of administration of suspension of killed vaccine | Air sac infected (*-1) | Isolation of Mycoplasma synoviae (*-2) | | Total evaluation (*-3) | Infection rate (%) |
|---|---|---|---|---|---|
|  |  | Trachea | Air sac |  |  |
| Intra-tracheal injection | 0/20 | 0/20 | 2/20 | 2/20 | 10 |
| Spraying | 0/20 | 0/20 | 1/20 | 1/20 | 5 |
| Control | 6/20 | 5/20 | 9/20 | 9/20 | 45 |

(*-1, *-2, *-3: See the legends in Table 5)

Test 7-1

Test 5 was repeated, except that the suspension of killed vaccine of Mycoplasma gallisepticum was replaced by a mixture of the suspension of killed vaccine of Mycoplasma gallisepticum obtained in Example 1 and the suspension of killed vaccine of Mycoplasma synoviae obtained in Example 4. Contagion of the immunized group and non-immunized group with the infected group was made 12 days after the final immunization. The results obtained are shown in Table 7-1.

Table 7-1

| Mode of administration of suspension of killed vaccine | Air sac infected (*-1) | Isolation of Mycoplasma gallisepticum (*-2) | | Air sac | Total evaluation (*-3) | Infection rate (%) |
|---|---|---|---|---|---|---|
| | | Trachea | Lung | | | |
| Intra-tracheal injection | 0/20 | 0/20 | 0/20 | 0/20 | 0/20 | 0 |
| Spraying | 0/20 | 0/20 | 0/20 | 0/20 | 0/20 | 0 |
| Control | 4/20 | 8/20 | 5/20 | 4/20 | 8/20 | 40 |

(*-1, *-2, *-3: See the legends in Table 5)

Test 7-2

Test 7-1 was repeated except that virulent Mycoplasma gallisepticum was replaced by virulent Mycoplasma synoviae having $5.0 \times 10^5$ living cells. The results obtained are shown in Table 7-2.

Table 7-2

| Mode of administration of suspension of killed vaccine | Air sac infected (*-1) | Insolation of Mycoplasma synoviae (*-2) | | Total elevation (*-3) | Infection rate (%) |
|---|---|---|---|---|---|
| | | Trachea | Air sac | | |
| Intra-tracheal injection | 0/20 | 0/20 | 1/20 | 1/20 | 5 |
| Spraying | 0/20 | 0/20 | 0/20 | 0/20 | 0 |
| Control | 2/20 | 4/20 | 7/20 | 7/20 | 35 |

(*-1), (*-2), (*-3) See the legends in Table 5

Test 8

Test 5 was repeated, except that the SPF-chickens, the suspension of killed vaccine of Mycoplasma gallisepticum and the virulent Mycoplasma gallisepticum were respectively replaced by SPF-pigs of 3 weeks old, the suspension of killed vaccine of Mycoplasma suipneumoniae obtained in Example 5 and virulent Mycoplasma suipneumoniae having $5.0 \times 10^6$ living cells. Immunization dose of the vaccine of one time was 0.5 ml. Six weeks after the contagion, the hogs were dissected to investigate, according to pathological observation on the lungs. The results obtained are shown in Table 8.

Table 8

| Vaccine | Mode of immunization | Infection rate* |
|---|---|---|
| Suspension of killed vaccine of Mycoplasma suipneumoniae | Spraying | 2/10 |
| | Intra-tracheal injection | 3/10 |
| Control | — | 8/10 |

*The denominator shows the number of test pigs, and the numerator shows the number of lung lesion positive pigs.

Test 9

Test 8 was repeated, except that the SPF-pigs, the suspension of killed vaccine of Mycoplasma suipneumoniae and the virulent Mycoplasma suipneumoniae, were respectively replaced by SPF-goats of 3 weeks old, the suspension of killed vaccine of Mycoplasma mycoides var. capri obtained in Example 7, and virulent Mycoplasma mycoides var. capri having $5.0 \times 10^6$ living cells. The results obtained are shown in Table 9.

Table 9

| Vaccine | Mode of immunization | Infection rate* |
|---|---|---|
| Suspension of killed vaccine of Mycoplasma mycoides var. capri | Spraying | 3/10 |
| Control | — | 10/10 |

*The denominator shows the number of test goats, and the numerator shows the number of lung lesion-positive goats.

Test 10

In order to know the effect of a suspension stabilizer to be incorporated with an killed Mycoplasma vaccine, the following comparative tests were conducted. The killed Mycoplasma gallisepticum cell suspension obtained in Example 1 and added with the suspension stabilizer, and the same killed Mycoplasma gallisepticum cell suspension without the addition of the suspension stabilizer were compared.

Specific pathogen-free (SPF) chickens of 10 days old were immunized by spraying 3 times at intervals of 10 days with each of the killed cell suspension and the suspension stabilizer incorporated killed vaccine (immunization dose of one time: at least 0.1 ml.). Ten days thereafter, the chickens were challenged by spraying with virulent Mycoplasma gallisepticum having about $7.4 \times 10^3$ living cells. Two weeks after the challenge, the test chickens were examined to evaluate the effects of the vaccines chiefly by the findings of air sacs and by the results of isolation of the Mycoplasma strain from tracheas, lungs and air sacs. The results are shown in Table 10.

Table 10

| Vaccine | Lesion score of chicken air sac disease (*-1) | Isolation of Mycoplasma gallisepticum (*-2) | | |
|---|---|---|---|---|
| | | Trachea | Lung | Air sac |
| Inactivated vaccine incorporated without suspension stabilizer | 0.70 | 2/10 | 0/10 | 1/10 |
| Inactivated vaccine incorporated with suspension stabilizer | 0.50 | 1/10 | 0/10 | 0/10 |
| Control | 2.10 | 10/10 | 10/10 | 8/10 |

(*-1) Same as in Table 1.
(*-2) Number of chickens from which Mycoplasma gallisepticum was isolated. That is, the dominator is the number of test chickness, and the numerator is the number of chickens from which Mycoplasma gallisepticum was isolated.

What is claimed is:

1. A suspension of killed Mycoplasma vaccine for immunizing respiratory mycoplasmosis of livestock and consisting essentially of formalin killed ultrasonically homogenized Mycoplasma cell, a physiologically acceptable aqueous medium of pH 6.0 to 7.8, and a suspension stabilizer.

2. A suspension of killed Mycoplasma vaccine according to claim 1 wherein said formalin killed and ultrasonically homogenized Mycoplasma vaccine is derived from a formalin-added cell suspension having a formalin concentration of 0.01 to 0.5%.

3. A suspension of killed Mycoplasma vaccine according to claim 1, wherein the aqueous medium is phosphate buffered saline solution.

4. A suspension of killed Mycoplasma vaccine according to claim 1, wherein the suspension stabilizer is a saccharide.

5. A suspension of killed Mycoplasma vaccine according to claim 4, wherein the saccharide is selected from the group consisting of glucose, sucrose, lactose and dextran.

6. A suspensison of killed Mycoplasma vaccine according to claim 5, wherein the saccharide is selected from the group consisting of lactose or dextran.

7. A suspension of killed Mycoplasma vaccine according to claim 1, wherein the suspension stabilizer is an amino acid.

8. A suspension of killed Mycoplasma vaccine according to claim 7, wherein the amino acid is selected from the group consisting of glutamic acid and glycine.

9. A suspension of killed Mycoplasma vaccine according to claim 8, wherein the amino acid is glutamic acid.

10. A suspension of killed Mycoplasma vaccine according to claim 1, wherein the suspension stabilizer is a serum.

11. A suspension of killed Mycoplasma vaccine according to claim 10, wherein the serum is selected from, the group consisting of chicken serum and chicken serum albumin when the Mycoplasma is *Mycoplasma gallisepticum*.

12. A suspension of killed Mycoplasma vaccine according to claim 1, wherein the suspension stabilizer is selected from the group consisting of sorbitan monooleate of polyoxyethylene, gelatin and disodium ethylenediamine tetraacetate.

13. A suspension of killed Mycoplasma vaccine according to claim 12, wherein the suspension stabilizer is selected from the group consisting of sorbitan monooleate of polyoxyethylene and gelatin.

14. A suspension of killed Mycoplasma vaccine according to claim 1, wherein the number of the killed Mycoplasma cells is at least $2.0 \times 10^5$ per ml of the vaccine.

15. A suspension of killed Mycoplasma vaccine according to claim 1, wherein the killed Mycoplasma cell is *Mycoplasma gallisepticum* cell and the livestock is poultry.

16. A method of immunization for respiratory infections Mycoplasma diseases of livestocks comprising administering a formalin killed and ultrasonically homogenized Mycoplasma vaccine to the livestocks by spraying or injecting the killed vaccine into trachea.

17. A method according to claim 16 wherein said formalin killed and ultrasonically homogenized Mycoplasma vaccine is derived from a formalin-added cell suspension having a formalin concentration of 0.01 to 0.5%.

18. A method according to claim 16, wherein the livestock is a poultry and the killed Mycoplasma vaccine is derived from *Mycoplasma gallisepecticum*.

* * * * *